(12) United States Patent
Suzuki et al.

(10) Patent No.: US 12,549,858 B2
(45) Date of Patent: Feb. 10, 2026

(54) ELECTRONIC DEVICE, AND CONTROL METHOD OF ELECTRONIC DEVICE

(71) Applicant: CANON KABUSHIKI KAISHA, Tokyo (JP)

(72) Inventors: Wataru Suzuki, Saitama (JP); Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 18/437,365

(22) Filed: Feb. 9, 2024

(65) Prior Publication Data

US 2024/0284051 A1    Aug. 22, 2024

(30) Foreign Application Priority Data

Feb. 16, 2023 (JP) ................. 2023-022684

(51) Int. Cl.
| | |
|---|---|
| *H04N 23/698* | (2023.01) |
| *H04N 23/55* | (2023.01) |
| *H04N 23/60* | (2023.01) |
| *H04N 23/667* | (2023.01) |
| *H04N 23/69* | (2023.01) |

(52) U.S. Cl.
CPC .......... *H04N 23/698* (2023.01); *H04N 23/55* (2023.01); *H04N 23/64* (2023.01); *H04N 23/667* (2023.01); *H04N 23/69* (2023.01)

(58) Field of Classification Search
CPC .... H04N 23/698; H04N 23/667; H04N 23/64; H04N 23/69; H04N 23/55; H04N 23/362; H04N 23/90
See application file for complete search history.

(56) References Cited

U.S. PATENT DOCUMENTS

| | | | |
|---|---|---|---|
| 2009/0179987 A1* | 7/2009 | Kim ................ | G06F 3/011 345/619 |
| 2019/0098212 A1* | 3/2019 | Shain ............... | H04N 23/90 |
| 2020/0007766 A1* | 1/2020 | Haruna ............ | H04N 23/815 |
| 2023/0164435 A1 | 5/2023 | Takahashi et al. | |

FOREIGN PATENT DOCUMENTS

| | | |
|---|---|---|
| JP | 2011-040898 A | 2/2011 |
| JP | 2016-019251 A | 2/2016 |
| WO | WO-2022019137 A1 * | 1/2022 ........ H04N 23/632 |

OTHER PUBLICATIONS

Co-pending U.S. Appl. No. 18/625,615, filed Apr. 3, 2024.
Jul. 12, 2024 Extended Search Report in European Patent Application Pub. No. 24 15 7791.5.

* cited by examiner

*Primary Examiner* — Kathleen V Nguyen
(74) *Attorney, Agent, or Firm* — Venable LLP (57) ABSTRACT

An electronic device sets one of a plurality of modes including a first mode and a second mode in which a size of an imaging range is different from that of the first mode; and performs control such that an image captured by using at least one of a plurality of lenses, of which optical axis directions are mutually different, is displayed on a display, wherein in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display.

16 Claims, 7 Drawing Sheets

ELECTRONIC DEVICE, AND CONTROL METHOD OF ELECTRONIC DEVICE

BACKGROUND OF THE INVENTION

Field of the Invention

The present invention relates to an electronic device, and a control method of the electronic device, and more particularly to a control method to display an image having a wide imaging range.

Description of the Related Art

Prevalent in recent years is an imaging apparatus that can capture an image in a range wider than a human angle of view, such as an omnidirectional image or a full spherical image, using a mirror or a plurality of lenses. A method of displaying a part of such an image in a wide range on a display, and changing the range of the image displayed on the display (display range) by following up the change of an orientation of the imaging apparatus, so as to create an elevated sense of immersion and realism (VR view), is known. In some imaging apparatuses, an image capturing mode can be switched between a mode in which an image of only one side (a part of directions) is captured using one lens, and a mode in which images of both sides (omni-directions) are captured using a plurality of lenses, and images corresponding to the image capturing mode that has been set can be displayed on the display. An image captured using an optical system which includes a spherical mirror or a hyperbolic mirror is an annular image, and a rectangular image is acquired by developing the annular image into a panoramic image. An image captured by using an optical system, which includes a fisheye lens, is a circular image, and a rectangular image is acquired by developing the circular image into a panoramic image.

Japanese Patent Application Publication No. 2011-040898 discloses a technique to generate a panoramic image with a predetermined direction (North, South, East or West) as the center. Japanese Patent Application Publication No. 2016-019251 discloses a technique to acquire a live view image by developing an image into a panoramic view in accordance with the orientation of a vari-angle monitor.

If the technique disclosed in Japanese Patent Application Publication No. 2011-040898 is used, the user can easily recognize the direction (North, South, East or West) where an object captured in the panoramic image exists. If the technique disclosed in Japanese Patent Application Publication No. 2016-019251 is used, the user can easily recognize the relationship between the live view image and the object captured in the live view image.

However, in the techniques disclosed in Japanese Patent Application Publication No. 2011-040898 and Japanese Patent Application Publication No. 2016-019251, switching the image capturing mode between the mode in which an image of only one side (a part of directions) is captured using one lens, and a mode in which images of both sides (omni-directions) are captured using a plurality of lenses, is not considered. Therefore, the user cannot easily (immediately) recognize a range (direction) of the image displayed on the display immediately after switching the image capturing mode, and an image in a desired range cannot be easily captured.

SUMMARY OF THE INVENTION

The present invention provides a technique to make it possible a technique for the user to easily (immediately) recognize the range (direction) of an image displayed on the display, and to easily capture an image in a desired range immediately after the image capturing mode is switched.

An electronic device according to the present invention includes: a processor; and a memory storing a program which, when executed by the processor, causes the electronic device to: set one of a plurality of modes including a first mode and a second mode in which a size of an imaging range is different from that of the first mode; and perform control such that an image captured by using at least one of a plurality of lenses, of which optical axis directions are mutually different, is displayed on a display, wherein in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display.

Further features of the present invention will become apparent from the following description of exemplary embodiments with reference to the attached drawings.

DESCRIPTION OF THE EMBODIMENTS

Figure 1A:
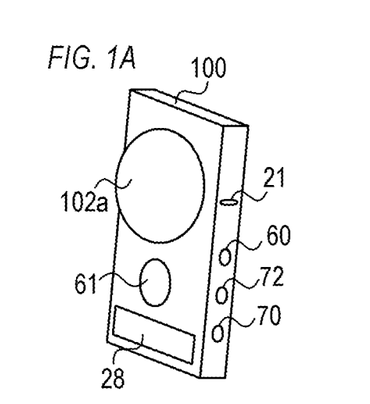
FIGS. 1A and 1B are external views of a digital camera.
Figure 1B:
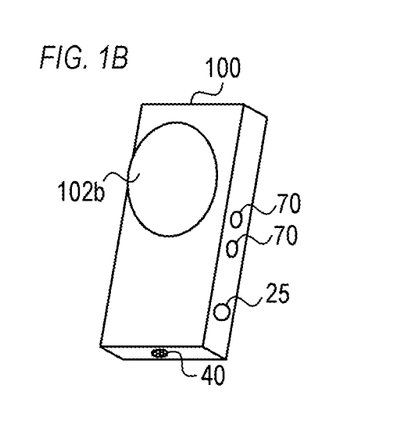

An embodiment of the present invention will now be described with reference to the drawings. FIG. 1A is a front perspective view (external view) of a digital camera 100 (imaging apparatus). FIG. 1B is a rear perspective view (external view) of the digital camera 100. The digital camera 100 is an omnidirectional camera (full spherical camera).

A barrier 102a is a protective window for protecting a front camera unit of which the image capturing range is in front of the digital camera 100. The front camera unit is, for example, a wide angel camera unit of which image capturing range is a wide range of at least 180° vertically and horizontally in front of the digital camera 100. A barrier 102b is a protective window for protecting a rear camera unit of which image capturing range is in the rear of the digital camera 100. The rear camera unit is, for example, a wide angel camera unit of which image capturing range is a wide range of at least 180° vertically and horizontally in the rear of the digital camera 100.

A display unit 28 displays various information. A shutter button 61 is an operation unit (operation member) to instruct image capturing. A mode selection switch 60 is an operation unit to switch various modes. A connection I/F 25 is a connector to connect a connection cable to the digital camera 100, and such an external device as a smartphone, a personal computer, and a TV is connected to the digital camera 100 using the connection cable. An operation unit 70 includes various switches, buttons, a dial, a touch sensor or the like to receive various operations performed by the user. A power supply switch 72 is a push button to switch the power supply ON/OFF.

A light-emitting unit 21 is a light-emitting member, such as a light-emitting diode (LED), which notifies the user on various states of the digital camera 100 using light-emitting patterns and light-emitting colors. A fixing unit 40 is a tripod screw hole, for example, and is used to securely install the digital camera 100 on such a fixing instrument as a tripod.

Figure 1C:
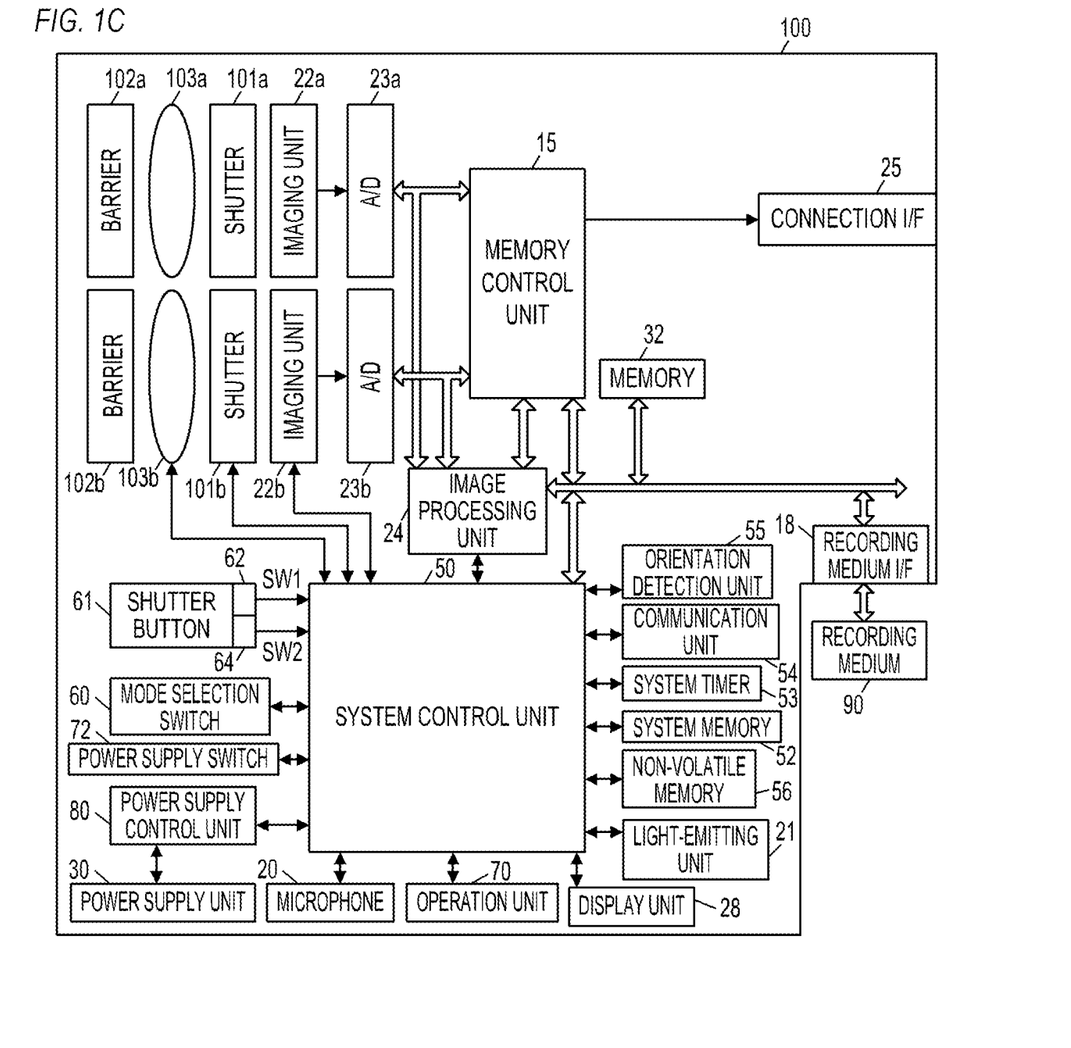
FIG. 1C is a block diagram of the digital camera.

FIG. 1C is a block diagram depicting a configuration example of the digital camera 100.

A barrier 102a covers an imaging system (an image capturing lens 103a, a shutter 101a, an imaging unit 22a, and the like) of the front camera unit, so as to prevent contamination of and damage to this imaging system. The image capturing lens 103a is a lens group including a zoom lens and a focus lens, and is a wide angle lens. The shutter 101a is a shutter having an aperture function to adjust the incident light quantity of the object light to the imaging unit 22a. The imaging unit 22a is an image pickup element (image sensor) including a CCD, CMOS element, or the like to convert an optical image into electric signals. An A/D convertor 23a converts analog signals outputted from the imaging unit 22a into digital signals. Instead of disposing the barrier 102a, an outer side surface of the image capturing lens 103a may be exposed so as to prevent contamination of and damage to the other imaging systems (shutter 101a, imaging unit 22a) using this image capturing lens 103a.

A barrier 102b covers an imaging system (an image capturing lens 103b, a shutter 101b, an imaging unit 22b, and the like) of the rear camera unit, so as to prevent contamination of and damage to this imaging system. The image capturing lens 103b is a lens group including a zoom lens and a focus lens, and is a wide angel lens. The shutter 101b is a shutter having an aperture function to adjust the incident light quantity of the object light to the imaging unit 22b. The imaging unit 22b is an image pickup element including CCD, CMOS element, or the like to convert an optical image into electric signals. An A/D convertor 23b converts analog signals outputted from the imaging unit 22b into digital signals. Instead of disposing the barrier 102b, an outer side surface of the image capturing lens 103b may be exposed so as to prevent contamination of and damage to the other imaging systems (shutter 101b, imaging unit 22b) using this image capturing lens 103b.

A virtual reality (VR) image is captured by the imaging unit 22a and the imaging unit 22b. The VR image here refers to an image that can be VR-displayed (displayed in display mode "VR view"). The VR image includes, for example, an omnidirectional image (full spherical image) captured by an omnidirectional camera (full spherical camera), and a panoramic image having an image range (effective image range) that is wider than a display range that can be displayed on the display unit at the same time. The VR image also includes not only a still image, but also a moving image and a live view image (an image acquired from the camera in near real-time). The VR image has an image range (effective image range) of a maximum 360° field-of-view in the longitudinal direction (vertical angle, angle from zenith, elevation/depression angle, altitude angle, pitch angle), and a maximum 360° field-of-view in the lateral direction (horizontal angle, azimuth angle, yaw angle).

The VR image includes an image having a wide angle-of-view (visual field range) that is wider than an angle-of-view which a standard camera can capture, or an image having an image range (effective image range) that is wider than the display range which can be displayed on the display unit at the same time, even if the image range is less than 360° in the longitudinal direction, and less than 360° in the lateral direction. For example, an image captured by a full spherical camera, which can capture an image of an object in a visual field (angle-of-view) that is 360° in the lateral direction (horizontal angle, azimuth angle), and a 210° vertical angle from the zenith as the center, is a type of the VR image. Further, for example, an image captured by a camera, which can capture an image of an object in a visual field (angle-of-view) that is 180° in the lateral direction (horizontal angle, azimuth angle), and a 180° vertical angle from the horizontal direction as the center, is a type of the VR image. In other words, an image which has an image range of a visual field that is at least 160° (±80°) in the longitudinal direction and the lateral direction respectively, and which has an image range wider than the range that a person can view at the same time, is a type of the VR image.

When this VR image is VR-displayed (displayed in the display mode "VR view"), the orientation of the display device (display device that displays the VR image) can be changed in the lateral rotating direction, whereby an omnidirectional image, that is seamless in the lateral direction (horizontal rotating direction), can be viewed. In the longitudinal direction (vertical rotating direction), a seamless omnidirectional image can be viewed in a ±105° range from directly above (zenith), but the range exceeding 105° from the zenith becomes a blank region in which there is no image. The VR image can be interpreted "as an image of which image range is at least a part of a virtual space (VR space)".

The VR display (VR view) refers to a display method (display mode) in which the display range is changeable so that an image in the visual field range in accordance with the orientation of the display device, among the VR images, is displayed. In the case of viewing an image in a state of wearing a head mounted display (HMD), which is a display device, an image in the visual field range, in accordance with the direction of the face of the user, is displayed. For example, in a VR image, it is assumed that an image in a visual angle (angle-of-view) centering at 0° in the lateral direction (specific azimuth, such as North), and 90° in the longitudinal direction (90° from zenith, that is horizontal) is displayed at a certain timing. If the orientation of the display device is front/back reversed in this state (e.g. display surface is changed from facing South to facing North), the display range in the same VR image is changed to an image in a visual angle centering at 180° in the lateral direction (opposite azimuth, such as South), and 90° in the longitudinal direction (horizontal). In other words, if the user turn their face from North to South (that is turns back) in the state of wearing the HMD, the image displayed on the HMD also changes from the image of the North to the image of the South. Because of such a VR display, the user can visually experience the sensation (sense of immersion) as if they are actually in the VR image (inside the VR space). A smartphone attached to the VR goggles (head mounted adaptor) can be regarded as a kind of HMD.

The display method of the VR image is not limited to the above mentioned method. The display range may be moved (scrolled) in accordance with the user operation via the touch panel, the direction button, or the like, instead of by changing the orientation. Further, in the VR display time (when the display mode is "VR view"), the display range may be changed by Touch-Move on the touch panel, a dragging operation with the mouse, pressing a direction button, or the like, in addition to changing the display range by changing the orientation.

An image processing unit 24 performs predetermined processing, such as pixel interpolation, resize processing (e.g. demagnification), and color conversion processing on data from the A/D convertor 23a or the A/D convertor 23b, or data from the memory control unit 15. The image processing unit 24 also performs predetermined arithmetic processing using the captured image data. A system control unit 50 performs exposure control and distance measurement control based on the arithmetic operation result acquired by the image processing unit 24. Thereby a through-the-lens (TTL) type auto focus (AF) processing, auto exposure (AE) processing, pre-flash emission (EF) processing, and the like, are performed. Furthermore, the image processing unit 24 performs predetermined arithmetic processing using the captured image data, and performs TTL type auto white balance (AWB) processing based on the acquired arithmetic operation result. The image processing unit 24 also performs basic image processing on 2 images (2 fisheye images: 2 wide angle images) acquired from the A/D convertor 23a and the A/D convertor 23b, and performs image connecting processing which composes 2 images after the basic image processing is performed, so as to generate a single VR image. Further, during VR display in live view or during reproduction, the image processing unit 24 performs image segmentation processing, magnifying processing, distortion correction processing and the like to VR-display the VR image, and performs rendering in which the processing result is drawn in the VRAM of the memory 32.

In the image connecting processing, the image processing unit 24 uses one of the 2 images as a reference image, and the other as a comparative image, calculates the deviation amount between the reference image and the comparative image for each area by pattern matching processing, and detects a connecting position to connect the 2 images based on the deviation amount for each area. Considering the detected connecting position and lens characteristics of each optical system, the image processing unit 24 corrects distortion of each image based on geometric conversion, and converts each image into an image in a full spherical format (full spherical image format). Then the image processing unit 24 composes (blends) the 2 images in the full spherical format, so as to generate one full spherical image (VR image). The generated full spherical image is an image generated using equidistant cylindrical projection, for example, and the position of each pixel of the full spherical image can be corresponded with coordinates on the surface of a sphere (VR space).

The data outputted from the A/D convertors 23a and 23b are written to a memory 32 via the image processing unit 24 and a memory control unit 15, or are written to the memory 32 via the memory control unit 15 alone, without using the image processing unit 24. The memory 32 stores image data, which is acquired by the imaging units 22a and 22b and then converted into digital data by the A/D convertors 23a and 23b, or image data to be outputted from the connection I/F 25 to an external display. The memory 32 has a storage capacity that is sufficient for storing a predetermined number of still images, or a predetermined duration of moving images and sound.

The memory 32 is also a memory used for image display (video memory). The data for image display stored in the memory 32 can be outputted to an external display via the connection I/F 25. In this case, the VR images captured by the imaging units 22a and 22b and generated by the image processing unit 24, which are stored in the memory 32, are transferred sequentially to the external display, and are displayed on the external display. Thereby the external display can implement the function as an electronic view finder, and can perform live view display (LV display). An image displayed in the live view display is hereafter called a "live view image (LV image)". Furthermore, the VR images stored in the memory 32 can also be transferred to an external device (e.g. smartphone) connected wirelessly via a communication unit 54, and be displayed on the external device side, whereby live view display (remote LV display) can be performed.

A non-volatile memory 56 is an electrically erasable/recordable memory, and is an EEPROM, for example. In the non-volatile memory 56, constants, programs, and the like, for operating the system control unit 50, are recorded. "Programs" here refers to the computer programs for executing various processing.

The system control unit 50 is a control unit including at least one processor or one circuit, and controls the digital camera 100 in general. The system control unit 50 implements each processing by executing a program recorded in the above mentioned non-volatile memory 56. A system memory 52 is a RAM, for example, and in the system memory 52, constants and variables for operating the system control unit 50, programs read from the non-volatile memory 56, and the like are developed. The system control unit 50 also performs display control by controlling the memory 32, the image processing unit 24, the memory control unit 15, and the like. A system timer 53 is a timer unit that measures the time used for various controls, and measures the time for an internal clock.

The mode selection switch 60, the shutter button 61, the operation unit 70 and the power supply switch 72 are used to input various operation instructions to the system control unit 50.

The mode selection switch 60 switches the operation mode of the system control unit 50 to one of: a still image recording mode, a moving image capturing mode, a reproduction mode, a communication connecting mode, and the like. The still image recording mode includes: an auto image capturing mode, an auto scene determining mode, a manual mode, an aperture priority mode (Av mode), a shutter speed priority mode (Tv mode), and a program AE mode. The modes also include various scene modes, in which the setting for image capturing is determined for each image capturing scene, and custom mode. The user can directly switch to one of the above mentioned modes using the mode selection switch 60. The user may also select an image capturing mode list screen first using the mode selection switch 60, then select one of a plurality of modes displayed on the display unit 28 using another operation member. In the same manner, the moving image capturing mode may include a plurality of modes.

The shutter button 61 includes a first shutter switch 62 and a second shutter switch 64. The first shutter switch 62 turns ON in mid-operation of the shutter button 61, that is, in the half depressed state (image capturing preparation instruction), and generates a first shutter switch signal SW1. Responding to the first shutter switch signal SW1, the system control unit 50 starts such image capturing preparation operations as auto focus (AF) processing, auto exposure (AE) processing, auto white balance (AWB) processing, and pre-flash emission (EF) processing. The second shutter switch 64 turns ON when operation of the shutter button 61 is completed, that is, in the fully depressed state (image capturing instruction), and generates a second shutter switch signal SW2. Responding to the second shutter switch signal SW2, the system control unit 50 starts a series of image capturing processing, from a step of reading signals from the imaging units 22a and 22b to a step of writing image data to the recording medium 90.

The shutter button 61 is not limited to the operation member which can perform the two-step operation of full depression and half depression, but may be an operation member which can perform only a one-step depression operation. In this case, the image capturing preparing operation and the image capturing processing are continuously performed responding to the one-step depression. This is the same operation as the case of fully depressing the shutter button which can perform both half depression and full depression (a case where the first shutter switch signal SW1 and the second shutter switch signal SW2 are generated almost simultaneously.)

An appropriate function is assigned to the operation unit 70 for each scene by selecting from various function icons and choices displayed on the display unit 28, and thereby the operation unit 70 functions as various function buttons. The function buttons are, for example, an end button, a return button, an image switching button, a jump button, a filter button and an attribute change button. For example, when the menu button is pressed, a menu screen, on which various settings can be performed, is displayed on the display unit 28. The user can operation the operation unit 70 while checking the menu screen displayed on the display unit 28, whereby various settings can be performed intuitively.

The power supply switch 72 is a push button to switch the power supply ON/OFF. A power supply control unit 80 includes a battery detection circuit, a DC-DC convertor, a switch circuit to switch a block to be energized, and the like, and detects whether or not a battery is installed, a type of battery, and residual amount of battery charge. The power supply control unit 80 also controls the DC-DC convertor based on this detection result and the instructions from the system control unit 50, and supplies the required voltage to each component, including a recording medium 90, for a required period of time. A power supply unit 30 includes a primary battery (e.g. alkali battery, lithium battery), a secondary battery (e.g. NiCd battery, NiMH battery, Li battery), an AC adaptor, and the like.

A recording medium I/F 18 is an interface with the recording medium 90, such as a memory card and a hard disk. The recording medium 90 is a recording medium to record captured images, such as a memory card, and includes a semiconductor memory, an optical disk, a magnetic disk, and the like. The recording medium 90 may be a recording medium which is detachable from the digital camera 100, or may be a recording medium embedded in the digital camera 100.

The communication unit 54 performs transmission/reception of video signals and audio signals with external devices connected wirelessly or via cable. The communication unit 54 is connectable to a wireless local area network (LAN) or Internet. The communication unit 54 can send images (including LV images) captured by the imaging units 22a and 22b, and an image recorded in the recording medium 90, and can receive images and various other information from an external device.

An orientation detection unit 55 detects an orientation of the digital camera 100 with respect to the gravity direction. Based on the orientation detected by the orientation detection unit 55, it can be determined whether the images captured by the imaging units 22a and 22b are images captured by the digital camera 100 held horizontally, or an image captured by the digital camera 100 held vertically. It can also determine the inclination of the digital camera 100 in 3 axes directions of yaw, pitch and roll (rotation direction) when the images were captured by the imaging units 22a and 22b. The system control unit 50 can attach the orientation information, in accordance with the orientation detected by the orientation detection unit 55, to an image file of the VR images captured by the imaging units 22a and 22b, or can rotate the images (adjust the orientation of the image so as to correct inclination (zenith correction)) and record the rotated images. For the orientation detection unit 55, one of: an acceleration sensor, a gyro sensor, a geo-magnetic sensor, an azimuth sensor, and an orientation sensor, or a combination of a plurality of sensors, may be used. By using the acceleration sensor, the gyro sensor, the azimuth sensor or the like constituting the orientation detection unit 55, a movement of the digital camera 100 (e.g. pan, tilt, lift, remain still) can also be detected.

A microphone 20 is a microphone to collect the surrounding sounds of the digital camera 100, which are recorded as sounds of a VR image (VR moving image). The connection I/F 25 is a connection plug, to which an HDMI® cable, a USB cable, or the like is connected to connect an external device and to perform transmission/reception of images therewith.

Figure 2A:
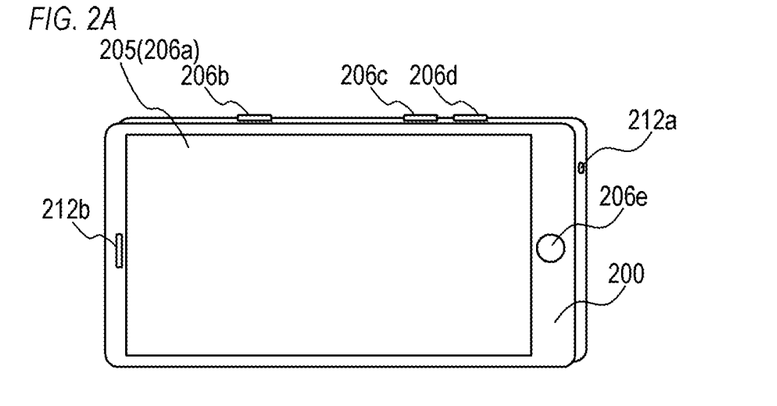
FIG. 2A is an external view of a display control device.

FIG. 2A is an external view of a display control device 200, which is a type of electronic device to which the present invention is applied. The display control device 200 is, for example, such a display device as a smartphone. A display 205 is a display unit to display images and various information. The display 205 is integrated with a touch panel 206a, such that the touch operation to the display surface of the display 205 can be detected. The display control device 200 can VR-display a VR image (VR contents) on the display 205. An operation unit 206b is a power supply button that receives the operation to switch the power supply ON/OFF of the display control device 200. An operation unit 206c and an operation unit 206d are volume buttons to increase/decrease the volume of the sound outputted from a speaker 212b, or to an earphone or an external speaker connected to a sound output terminal 212a. An operation unit 206e is a home button to display a home screen on the display 205. The sound output terminal 212a is an earphone jack, and is a terminal to output audio signals to an earphone and an external speaker. The speaker 212b is a speaker to output sound and is embedded in the main unit.

Figure 2B:
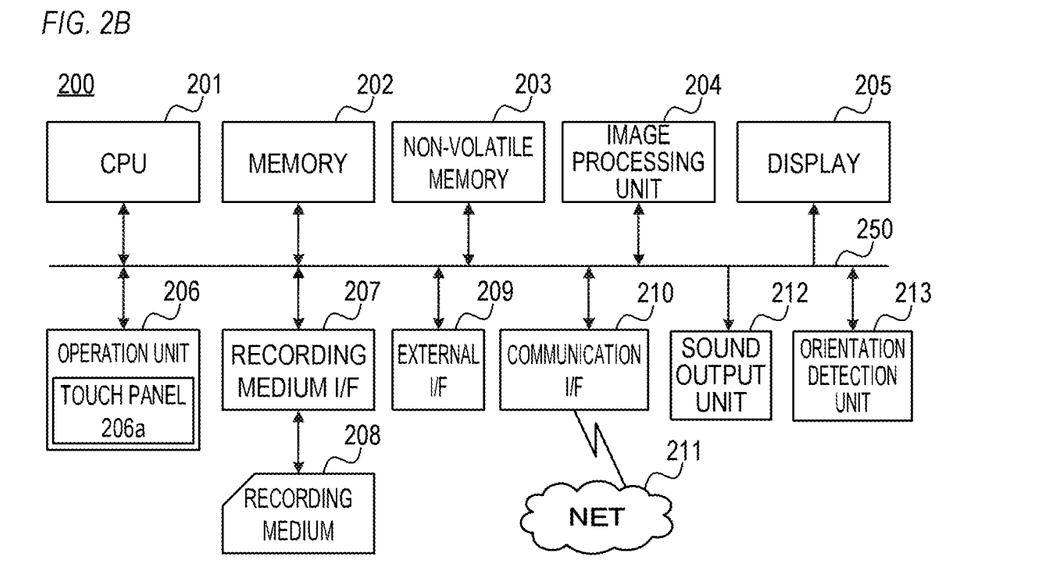
FIG. 2B is a block diagram of the display control device.

FIG. 2B is a block diagram depicting a configuration example of the display control device 200. A CPU 201, a memory 202, a non-volatile memory 203, an image processing unit 204, a display 205, an operation unit 206, a recording medium I/F 207, an external I/F 209, and a communication I/F 210 are connected to an internal bus 250. Further, a sound output unit 212 and an orientation detection unit 213 are also connected to the internal bus 250. Each component connected to the internal bus 250 can exchange data with each other via the internal bus 250.

The CPU 201 is a control unit that controls the display control device 200 in general, and includes at least one processor or one circuit. The memory 202 includes a RAM (e.g. volatile memory using a semiconductor element), for example. According to a program stored in the non-volatile memory 203, for example, the CPU 201 controls each component of the display control device 200 using the memory 202 as a work memory. Image data, sound data, other data, various programs for the CPU 201 to operate, and the like are stored in the non-volatile memory 203. The non-volatile memory 203 includes a flash memory, a ROM, or the like, for example.

Based on the control by the CPU 201, the image processing unit 204 performs various image processing on images stored in the non-volatile memory 203 and the recording medium 208, video signals acquired via the external I/F 209, images acquired via the communication I/F 210, and the like. The image processing performed by the image processing unit 204 includes: A/D conversion processing, D/A conversion processing, image data encoding processing, compression processing, decoding processing, magnifying/demagnifying processing (resize), noise reduction processing, color conversion processing, and the like. Further, the image processing unit 204 also performs various image processing of panoramic development, mapping and conversion of a VR image, which is an omni-distance image, or a wide range image which is not an omni-distance image but is an image having a wide angle. The image processing unit 204 may be configured with a dedicated circuit block to perform a specific image processing. Depending on the type of image processing, the CPU 201 may perform the image processing in accordance with the program without using the image processing unit 204.

The display 205 displays an image, a GUI screen that constitutes a GUI (Graphical User Interface), or the like, based on control of the CPU 201. The CPU 201 generates a display control signal in according with the program, and controls each component of the display control device 200 so that video signals to be displayed on the display 205 are generated and outputted to the display 205. The display 205 displays the image based on the video signals generated and outputted. The configuration of the display control device 200 itself may include only the components up to the interface to output the video signals to be displayed on the display 205, and the display 205 may be configured with an external monitor (TV, HMD).

The operation unit 206 is an input device to receive user operations, such as a text information input device (e.g. keyboard), a pointing device (e.g. mouse, touch panel), buttons, a dial, a joy stick, a touch sensor, a touch pad, and the like. In the present embodiment, the operation unit 206 includes the touch panel 206a and the operation units 206b, 206c, 206d and 206e.

A recording medium 208, such as a memory card, CD and DVD, is attachable to the recording medium I/F 207. Based on the control of the CPU 201, the recording medium I/F 207 reads data from the attached recording medium 208, or writes data to the recording medium 208. The recording medium 208 is a storage unit that stores data, such as an image to be displayed on the display 205. The external I/F 209 is an interface to connect an external device wirelessly or via a cable (e.g. USB cable), so as to input/output video signals and audio signals (data communication). The communication I/F 210 is an interface to communicate with an external device, Internet 211, or the like (wireless communication), so as to perform transmission/reception (data communication) of various data, such as files and commands. The communication I/F 210 can communicate with the communication unit 54 of the digital camera 100 indicated in FIG. 1C. The display control device 200 can receive an image (or video) captured by the digital camera 100, and display this data on the display 205 of the display control device 200.

The sound output unit 212 outputs the sounds of the moving image and music data reproduced on the display control device 200, operation tones, ring tones, and various notification tones. The sound output unit 212 includes the sound output terminal 212a to connect an earphone or the like, and the speaker 212b, but the sound output unit 212 may output the sound data to an external speaker via wireless communication or the like.

The orientation detection unit 213 detects the orientation (inclination) of the display control device 200 with respect to the gravity direction, and the orientation of the display control device 200 with respect to each axis in the yaw direction, the pitch direction and the roll direction, and notifies the orientation information to the CPU 201. Based on the orientation detected by the orientation detection unit 213, it can be determined whether the display control device 200 is held horizontally, or held vertically, or turned upward or turned downward, or in a diagonal orientation. It can also be determined whether the display control device 200 is inclined in a rotating direction (e.g. yaw direction, pitch direction, roll direction), and the degree of inclination. It can also be determined whether the display control device 200 is rotated in the rotating direction. One of the sensors of an acceleration sensor, a gyro sensor, a geo-magnetic sensor, an azimuth sensor, an altitude sensor, and the like, or a combination of a plurality of sensors thereof, may be used as the orientation detection unit 213.

As mentioned above, the operation unit 206 includes the touch panel 206a. The touch panel 206a is a planar input device which is superimposed on the display 205, and is configured such that coordinate information in accordance with a touched position is outputted. The CPU 201 can detect the following operations or states on the touch panel 206a.

a finger or pen which does not touch the touch panel 206a initially touches the touch panel 206a, that is the start of touch (hereafter Touch-Down)

a finger or a pen is touching the touch panel 206a (hereafter Touch-On)

a finger or a pen is moving on the touch panel 206a in the touched state (hereafter, Touch-Move)

a finger or a pen touching the touch panel 206a is released from the touch panel 206a, that is, the end of touch (hereafter Touch-Up)

Nothing is touching the touch panel 206a (hereafter Touch-Off)

When Touch-Down is detected, Touch-On is detected simultaneously. Unless Touch-Up is detected after Touch-Down, normally Touch-On is continuously detected. When Touch-Move is detected as well, Touch-On is detected simultaneously. Even if Touch-On is detected, Touch-Move is not detected unless the touch position is moving. When Touch-Up of a finger and a pen is detected, Touch-Off is detected.

These operations/states and coordinates of the positions on the touch panel 206a where a finger or a pen is touching are notified to the CPU 201 via the internal bus. Based on the notified information, the CPU 201 determines which operation (touch operation) was performed on the touch panel 206a. For Touch-Move, the moving direction of the finger or the pen moving on the touch panel 206a can also be determined for the vertical component and the horizontal component on the touch panel 206a respectively, based on the change of the positional coordinates. In the case where Touch-Move for a predetermined distance or more is detected, the CPU 201 determines that the slide operation was performed.

An operation of quickly moving a fingertip touching the touch panel 206a and releasing the fingertip from the touch panel 206a is called a "flick". In other words, flick is an operation of quickly moving (flicking) the finger on the touch panel 206a. In a case where Touch-Move, for at least a predetermined distance at a predetermined speed or faster, is detected and Touch-Up is detected thereafter, it is determined that flick was performed (it is determined that flick occurred immediately after the slide operation).

Furthermore, a touch operation of touching a plurality of locations (e.g. 2 points) simultaneously and moving these touch positions close to each other is called a "Pinch-In", and the touch operation of moving these touch positions away from each other is called a "Pinch-Out". Pinch-In and Pinch-Out are collectively called a "pinch operation" (or simply "pinch"). The type of the touch panel 206a may be any of various types, such as a resistive film type, an electrostatic capacitive type, a surface acoustic wave type, an infrared type, an electro-magnetic induction type, an image recognition type, and a photosensor type. Some types detect touch when the touch panel is actually contacted, while other types detect touch when a finger or a pen approaches the touch panel, but either type can be used.

Figure 2C:
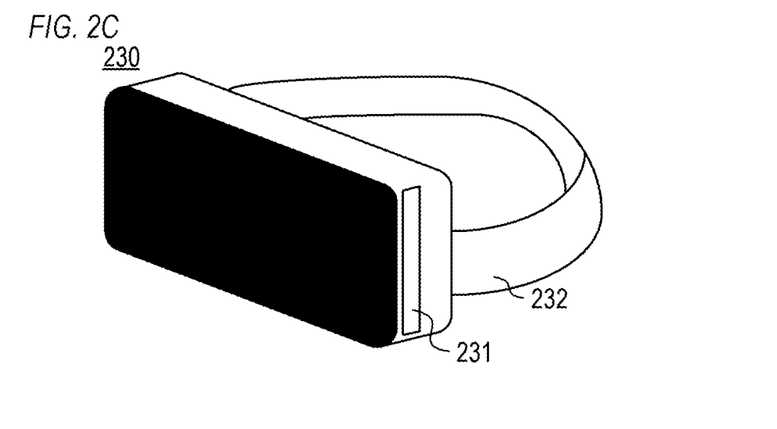
FIG. 2C is an external of VR goggles.

FIG. 2C is an external view of VR goggles (head mounted adaptor) 230 on which the display control device 200 is installed. By being installed to the VR goggles 230, the display control device 200 can be used as a head mounted display. An insertion port 231 is an insert port to insert the display control device 200. The display control device 200 can be completely inserted into the VR goggles 230, with the display surface of the display 205 being oriented to face the head band 232, which is used for securing the VR goggles 230 to the head of the user (i.e., to face the user). In the state where the VR goggles 230, in which the display control device 200 is installed, are mounted on the head of the user, the user can view the display 205 without holding the display control device 200 by hand. In this case, the orientation of the display control device 200 changes as the user moves their head or body. The orientation detection unit 213 detects the change of the orientation of the display control device 200 at this time, and the CPU 201 performs processing for VR display based on this change of orientation. Here the orientation detection unit 213, detecting the orientation of the display control device 200, is equivalent to detecting the orientation of the head of the user (direction where the line-of-sight of the user is directed). The display control device 200 itself may be an HMD which can be mounted on the head without using the VR goggles.

Figure 3:
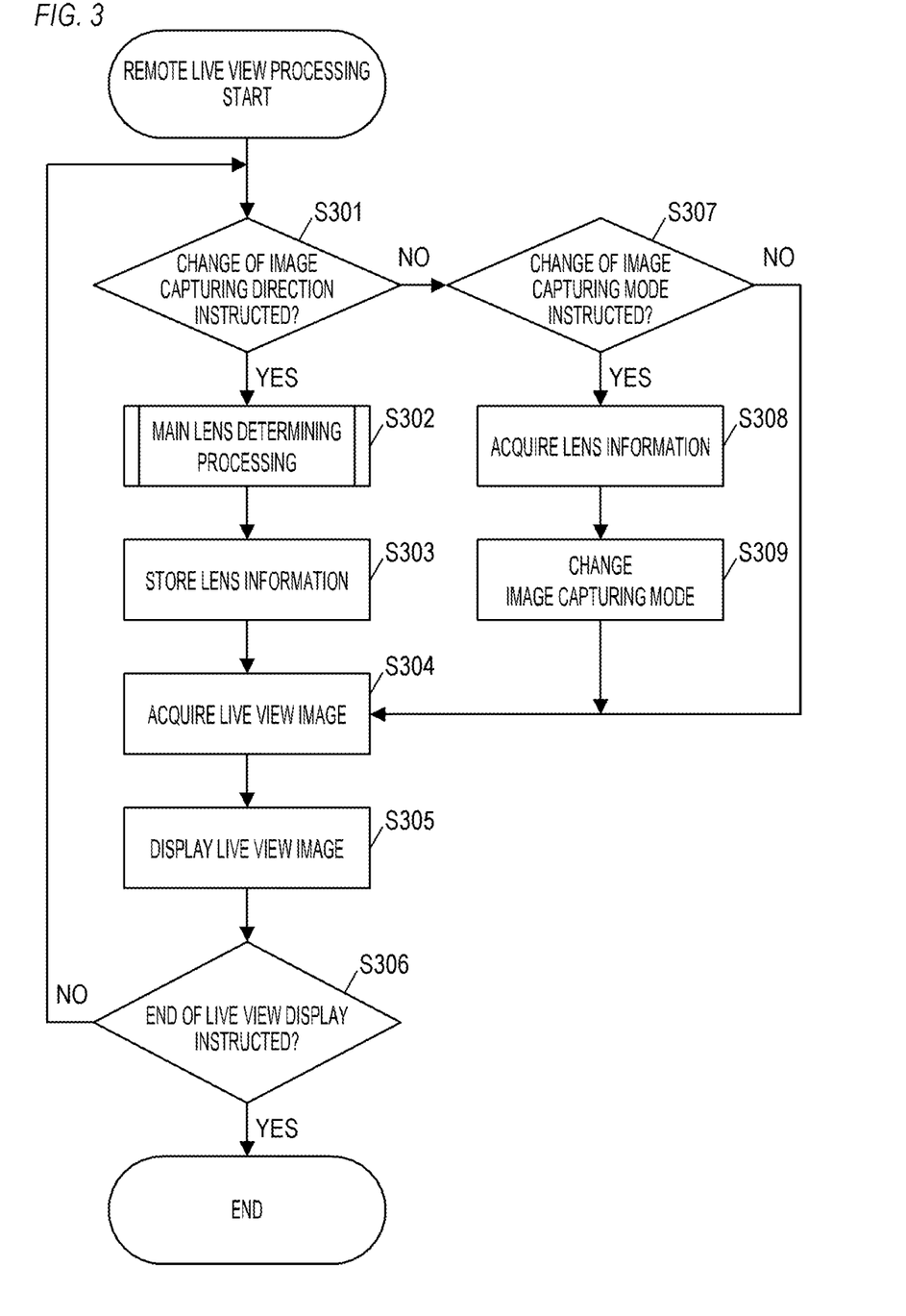
FIG. 3 is a flow chart of remote live view processing.

FIG. 3 is a flow chart depicting an example of remote live view processing of the display control device 200. This processing is implemented by the CPU 201 developing the program, which is stored in the non-volatile memory 203, in the memory 202, and executing the program. When the power of the display control device 200 is turned ON, and the display control device 200 is set to the display mode in which remote live view of an image (or video) captured by the digital camera 100 is displayed, the processing in FIG. 3 starts.

In the present embodiment, one of a plurality of image capturing modes can be set for the digital camera 100, including a first image capturing mode, and a second image capturing mode in which the size of the image capturing range (imaging range) is different from the first image capturing mode. The image capturing mode of the digital camera 100 can be set directly from the digital camera 100, or can be set remotely from the display control device 200. In the present embodiment, the imaging range of the second image capturing mode is larger than the imaging range of the first image capturing mode. Here the first image capturing mode is an image capturing mode in which an image (normal image) having an angle-of-view (viewing angle) less than 180° is captured (imaged) using one of the image capturing lens 103a and the image capturing lens 103b. The second image capturing mode is an image capturing mode in which an image (full spherical image, VR image) having a 360° angle-of-view (viewing angle) is captured (imaged) using both the image capturing lens 103a and the image capturing lens 103b.

Here the digital camera 100 has 2 image capturing lenses 103a and 103b, but a number of image capturing lenses included in the digital camera 100 is not especially limited. Further, here one image capturing lens is used in the first image capturing mode, and both of the image capturing lenses are used in the second image capturing mode, but a number of image capturing lenses used in each image capturing mode is not especially limited. The angle-of-view (visual angle) in each image capturing mode is not especially limited either. The digital camera 100 may have 3 or more image capturing lenses of which optical axis directions are mutually different, and 2 or more image capturing lenses may be used in the first image capturing mode, and a part of these image capturing lenses may be used in the second image capturing mode. For example, the digital camera 100 may have 5 image capturing lenses, of which 2 image capturing lenses are used in the first image capturing mode, and 4 image capturing lenses are used in the second image capturing mode. The optical axis direction is a direction moving away from the digital camera 100, out of the directions parallel with the optical axis of the image capturing lens. "Using an image capturing lens" refers to "inputting the object light that entered via this image capturing lens into the imaging unit 22". A plurality of image capturing lenses, of which optical axis directions are mutually different, may be interpreted as a plurality of optical systems to image an object in mutually different directions.

In the first image capturing mode, a first image may be generated by imaging an object in a first imaging range in a first direction. In the second image capturing mode, a second image may be generated by imaging an object in a second imaging range, including the first direction. The first image may be an image acquired by using any one of a plurality of optical systems (a plurality of image capturing lenses). The second image may be an image acquired using at least 2 of the plurality of optical systems. At least 2 optical systems used in the second image capturing mode may include an optical system that is used in the first image capturing mode.

In S301, the CPU 201 determines whether or not the user instructed to change the image capturing direction (imaging direction, display direction). The operation to instruct changing the image capturing direction (change operation) is neither the operation of moving the digital camera 100, nor the operation of changing the orientation of the digital camera 100. In both the first image capturing mode and the second image capturing mode, the operation to change the image capturing direction is an operation using the operation unit 206 (e.g. touch operation on touch panel 206a, or operation using other physical buttons). In the first image capturing mode, the operation to change the image capturing direction is an operation to switch the image capturing lens to be used between the image capturing lens 103a and the image capturing lens 103b. In the second image capturing mode, the operation to change the image capturing direction is an operation to change the range (display range) of the captured image that is displayed on the display 205. Processing advances to S302 if it is determined that the user instructed to change the image capturing direction, or advances to S307 if not.

In S302, based on the current image capturing direction (imaging direction, display direction), the CPU 201 determines an image capturing lens that satisfies a predetermined condition as a main lens (main lens determining processing). The main lens determining processing will be described in detail later with reference to FIG. 5. In the present embodiment, one of the image capturing lens 103a and the image capturing lens 103b is used as the main lens. Then the imaging range (display range), that is displayed on the display 205 after switching the image capturing mode, is determined based on the main lens. For the main lens, 2 or more image capturing lenses may be determined.

In S303, the CPU 201 stores the lens information on the main lens determined in S302 in a storage unit (e.g. memory 202). The lens information indicates at least one of: a determined main lens; and an image capturing direction (imaging direction, display direction) when the main lens was determined. For example, the lens information includes at least one of: identification information that indicates the main lens; and direction information that indicates the image capturing direction.

In S304, the CPU 201 acquires an image to be displayed on the display 205 (image data of live view image). In the first image capturing mode, a normal image captured by one of the image capturing lens 103a and the image capturing lens 103b is acquired. In the second image capturing mode, a VR image generated from an image captured by the image capturing lens 103a and an image captured by the image capturing lens 103b are acquired.

In S305, the CPU 201 displays the image acquired in S304 (live view image) on the display 205. The user performs an operation to capture the object in the display range while checking the display 205. The CPU 201 may further display various items, such as an item to indicate a current image capturing direction, an item (icon) to indicate a current image capturing mode, an item (icon) to receive user operation, and items (icons) to indicate other camera setting values. These items are displayed superimposed on the image acquired in S304. The items to be displayed may be different depending on the image capturing mode.

Figure 4A:
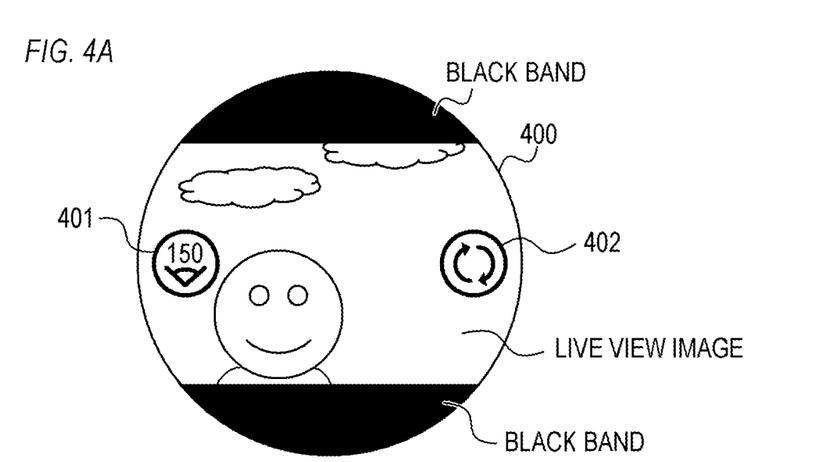
FIGS. 4A and 4B are schematic diagrams of a display screen.
Figure 4B:
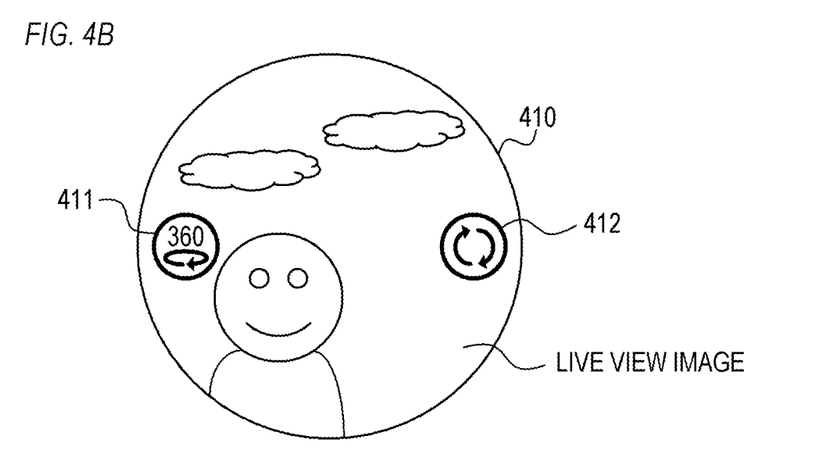

FIGS. 4A and 4B indicate examples of a screen displayed on the display 205. The shape of the screen is not limited to a circle, but may be a rectangle, for example. A screen 400 in FIG. 4A is a screen in the first image capturing mode. On the screen 400, black bands are displayed in the upper and lower portions of the live view image. Further, on the screen 400, items 401 and 402, which receive user operation, are displayed. The item 401 indicates that the current image capturing mode is the first image capturing mode, and if the item 401 is touched, the image capturing mode to be set is switched from the first image capturing mode to the second image capturing mode. If the item 402 is touched, the image capturing lens to be used is switched between the image capturing lens 103a and the image capturing lens 103b. The screen 410 in FIG. 4B is a screen in the second image capturing mode. The black bands are not displayed in the upper and lower portions of the live view image on the screen 410. Further, items 411 and 412, to receive user operation, are displayed on the screen 410. The item 411 indicates that the current image capturing mode is the second image capturing mode, and if the item 411 is touched, the image capturing mode to be set is switched from the second image capturing mode to the first image capturing mode. If the item 412 is touched, the image capturing direction (imaging direction, display direction) is changed to the initial direction. The initial direction is the optical axis direction of the image capturing lens 103b, for example.

In both the first image capturing mode and the second image capturing mode, at least a part of the live view image is displayed on the screen. In the first image capturing mode, the display range of the live view image (range displayed on the display 205) cannot be changed, and in the second image capturing mode, the display range of the live view image can be changed.

In S306, the CPU 201 determines whether or not the user instructed to end the live view display. The remote live view processing in FIG. 3 is ended if it is determined that the end of the live view display was instructed, or processing advances to S301 if not.

In S307, the CPU 201 determines whether or not the user instructed to change the image capturing mode. Processing advances to S308 if it is determined that change of the image capturing mode was instructed, or advances to S304 if not.

In S308, the CPU 201 acquires the lens information stored in the storage unit.

In S309, the CPU 201 changes (switches) the image capturing mode. For example, the CPU 201 switches the image capturing mode to be set from one of the first image capturing mode and the second image capturing mode to the other. At this timing, the CPU 201 may notify the user that the image capturing mode was changed. The notification method is not especially limited, and, for example, various information may be notified to the user by lighting a light source or by displaying an item.

In S304, performed after S309, the CPU 201 specifies the main lens based on the lens information acquired in S308, and displays an image of an imaging range (range imaged using the main lens) corresponding to the main lens on the display 205. In the present embodiment, using the latest lens information (lens information immediately before switching the image capturing mode), the CPU 201 displays the image of the imaging range, corresponding to the main lens related to this lens information, on the display 205.

Here the processing steps S302 and S303 are performed immediately after the change of the image capturing direction is instructed, but the timings of the processing steps S302 and S303 are not limited to this. For example, the processing steps S302 and S303 may be performed immediately after the change of the image capturing mode is instructed (between S307 and S308).

Figure 5:
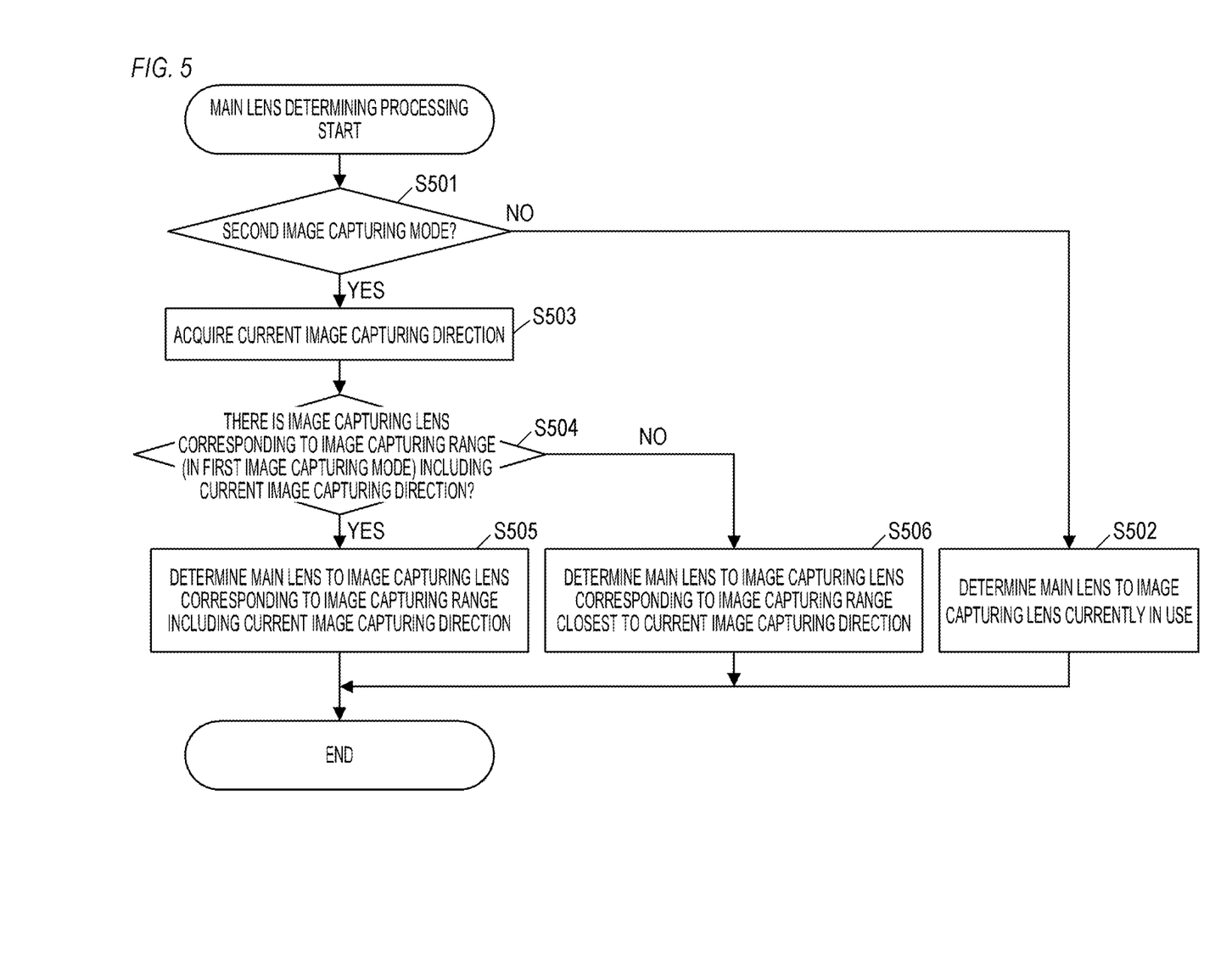
FIG. 5 is a flow chart of main lens determining processing.

FIG. 5 is a flow chart depicting an example of the main lens determination processing (S302 in FIG. 3) of the display control device 200.

In S501, the CPU 201 determines whether the current image capturing mode is the first image capturing mode or the second image capturing mode. Processing advances to S502 if the current image capturing mode is the first image capturing mode, or advances to S503 if the current image capturing mode is the second image capturing mode.

In S502, the CPU 201 determines the image capturing lens currently in use as the main lens.

In S503, the CPU 201 acquires information on the current image capturing direction (imaging direction, display direction).

In S504, the CPU 201 determines whether or not there is an image capturing lens corresponding to the image capturing range (imaging range) that includes the current image capturing direction. Here the image capturing range is assumed to be an image capturing range in the first image capturing mode (angle-of-view (viewing angle) less than 180°). Processing advances to S505 if it is determined that there is an imaging capturing lens corresponding to the image capturing range that includes the current image capturing direction, or advances to S506 if not.

In S505, the CPU 201 determines the image capturing lens corresponding to the image capturing range, that includes the current image capturing direction (image capturing range in the first image capturing mode) as the main lens.

In S506, the CPU 201 determines the image capturing lens corresponding to the image capturing range closest to the current image capturing direction (image capturing range in the first image capturing mode) as the main lens.

The main lens determined in the main lens determining processing in FIG. 5 is an image capturing lens that corresponds to the imaging range displayed on the display 205. The main lens determined in the main lens determining processing in FIG. 5 is also an image capturing lens of which optical axis direction is closest to the current image capturing direction (imaging direction or display direction that corresponds to the center of the imaging range displayed on the display 205). This main lens may be interpreted as an image capturing lens corresponding to the image capturing range displayed most widely on the display 205, or may be interpreted as an image capturing lens corresponding to the imaging range of which display area on the display 205 is largest.

Figure 6A:
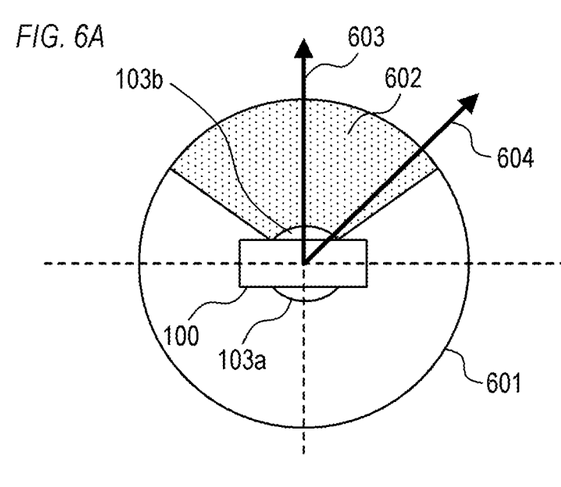
FIGS. 6A to 6C are schematic diagrams depicting an operation of the digital camera.

FIG. 6A is a schematic diagram depicting a state of the digital camera 100 viewed from the top. An image capturing range 601 is a range that is captured (imaged) using both the image capturing lens 103a and the image capturing lens 103b in the second image capturing mode, and corresponds to a 360° angle-of-view (viewing angle). An image capturing range 602 (shaded portion) is a range that is captured (imaged) using the image capturing lens 103b in the first image capturing mode, and corresponds to an angle-of-view (viewing angle) less than 180°. The direction 603 is an imaging direction indicating the center of an image capturing range 602, which is also an optical axis direction of the image capturing lens 103b. When the image capturing lens 103b is selected in the first image capturing mode, the image in the image capturing range 602 centered around the direction 603 is captured, and is displayed on the display 205. In a case where the current image capturing mode is the second image capturing mode, and the current image capturing direction is a direction 604, the image capturing lens 103b is determined as the main lens, since the direction 604 is included in the image capturing range 602 in the first image capturing mode (S505 in FIG. 5).

Figure 6B:
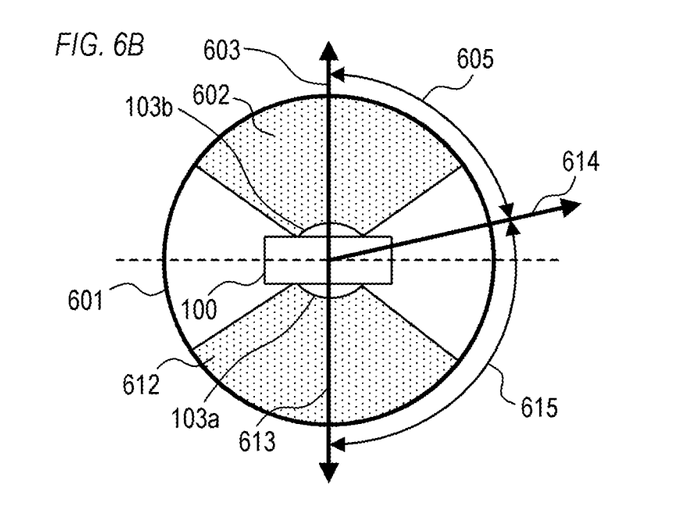

FIG. 6B is also a schematic diagram depicting a state of the digital camera 100 viewed from the top. The image capturing range 601, the image capturing range 602, and the direction 603 are as described above. An image capturing range 612 (shaded portion) is a range that is captured (imaged) using the image capturing lens 103a in the first image capturing mode, and corresponds to an angle-of-view (viewing angle) less than 180°. A direction 613 is an imaging direction indicating the center of the image capturing range 612, which is also an optical axis direction of the image capturing lens 103a. When the image capturing lens 103a is selected in the first image capturing mode, the image in the image capturing range 612 centered around the direction 613 is captured, and is displayed on the display 205. A case where the current image capturing mode is the second image capturing mode, and the current image capturing direction is a direction 614 will be considered here. The direction 614 is included neither in the image capturing range 602 nor in the image capturing range 612 in the first image capturing mode.

Further, an angle 605 formed by the direction 614 and the direction 603 is smaller than an angle 615 formed by the direction 614 and the direction 613. Therefore as the image capturing range closest to the current image capturing direction, the image capturing range 602 is detected from the plurality of image capturing ranges in the first image capturing mode, and the image capturing lens 103b is determined as the main lens (S506 in FIG. 5). In the example described above, the angle formed by the image capturing direction and the optical axis direction is used as the distance between the image capturing direction and the image capturing range, but the present invention is not limited to this. For example, as the distance between the image capturing direction and the image capturing range, a minimum angle formed by the image capturing direction and the imaging direction corresponding to the edge of the image capturing range may be used.

As mentioned above, according to the present embodiment, if the image capturing mode is switched, an image of the imaging range, that corresponds to the image capturing lens satisfying the predetermined condition (image capturing lens corresponding to the imaging range which was displayed immediately before switching of the image capturing mode), is displayed. For example, it is assumed that the image capturing mode to be set is switched from the second image capturing mode to the first image capturing mode in the state where the imaging range corresponding to the image capturing lens 103b is displayed on the display 205. In this case, the imaging range corresponding to the image capturing lens 103b (e.g. imaging range centered around the direction 603 in FIG. 6B) is displayed on the display 205 in the first image capturing mode. Then it is assumed that after switching the imaging range displayed on the display 205 from the imaging range corresponding to the image capturing lens 103b to the imaging range corresponding to the image capturing lens 103a in the first image capturing mode, the image capturing mode to be set is switched from the first image capturing mode to the second image capturing mode. In this case, the imaging range corresponding to the image capturing lens 103a (e.g. imagining range centered around the direction 613 in FIG. 6B) is displayed on the display 205 in the second image capturing mode. Thereby the user can easily (immediately) recognize the range (direction) of the image (or video) displayed immediately after switching the image capturing mode, and the user can therefore easily capture a desired range of the image.

Further, it is assumed that a first image is generated by imaging an object in the first imaging range in the first direction in the first image capturing mode. According to the present embodiment, when the mode to be set is switched from the first image capturing mode to the second image capturing mode, a second image is generated by imaging an object in the second imaging range that includes a first direction, and the imaging range in the first direction out of the second image is displayed. When the mode to be set is switched from the second image capturing mode to the first image capturing mode, a third image is generated by imaging an object in the second direction, which corresponds to the displayed imaging range out of the second image, and at least a part of the third image is displayed.

In the above description, various controls are performed by the CPU 201, but may be performed by one hardware component, or may be performed by a plurality of hardware components (e.g. a plurality of processors or circuits), so as to control the entire device.

While embodiments of the present invention have been described, the present invention is not limited to these specific embodiments, but various forms within a scope not departing from the spirit of the present invention are also included in the invention. Each embodiment described above is merely an example, and each embodiment may be combined with each other.

In the descriptions of the embodiments, the present invention is applied to the display control device as an example, but the present invention is not limited to this example, but can be applied to any electronic device which can perform control to display live view images. For example, the present invention is applicable to a personal computer, a PDA, a portable telephone terminal, a portable image viewer, a printer, a digital photo frame, a music player, a game machine, an electronic book reader, a video player, and the like. The present invention is also applicable to a digital camera, a display device (including a projector), a tablet terminal, a smartphone, an AI speaker, a home electronic device, an onboard device, a medical device, and the like.

For example, the remote live view processing in FIG. 3 may be executed as live view processing in the digital camera 100. Further, the CPU 201 of the display control device 200 may display the live view image on the display unit 28 of the digital camera 100 by performing processing similar to the remove live view processing in FIG. 3. Furthermore, the system control unit 50 of the digital camera 100 may display the live view image on the display 205 of the display control device 200 by performing processing similar to the remote live view processing in FIG. 3.

In the case where the image capturing mode to be set is switched from the first image capturing mode to the second image capturing mode, the image capturing direction (imaging direction or display direction corresponding to the center of the image range to be displayed) does not change. In the case where the image capturing mode to be set is switched from second image capturing mode to the first image capturing mode, on the other hand, the image capturing direction may change radically. For example, in the case where the image capturing direction in the second image capturing mode is not included in any of the plurality of image capturing ranges in the first image capturing mode, as in the case of the direction 614 in FIG. 6B, the image capturing direction changes radically if the image capturing mode to be set is switched from the second image capturing mode to the first image capturing mode. In the case where the image capturing direction in the second image capturing mode corresponds to the edge of the image capturing range in the first image capturing range as well, the image capturing direction changes radically if the image capturing mode to be set is switched from the second image capturing mode to the first image capturing mode. If the image capturing mode changes radically, the user may lose sight of the object, or may not recognize the image capturing direction easily (immediately). Hence the user cannot adjust the image capturing direction easily (immediately) after the image capturing mode is switched.

In such a case (e.g. in the case where the angle formed by the image capturing direction and the optical axis direction closest to this image capturing direction (angle 615 in FIG. 6B) is larger than a threshold), the CPU 201 may notify the user that the switching of the image capturing mode changes the image capturing direction radically.

Figure 6C:
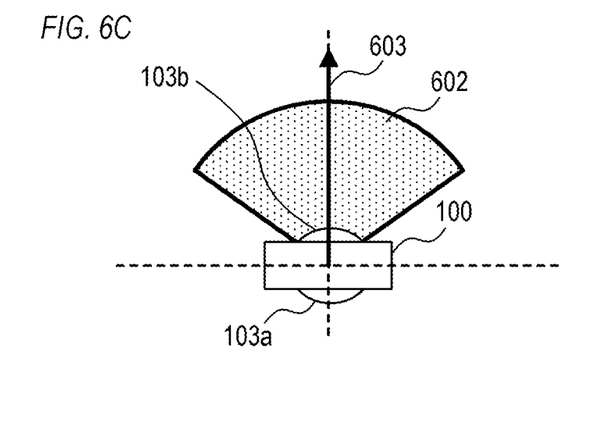

Here it is assumed that the user instructs to switch the image capturing mode to be set from the second image capturing mode to the first image capturing mode, in the state where the angle formed by the image capturing direction and the optical axis direction closest to this image capturing direction (angle 615 in FIG. 6B) is larger than the threshold. In this case, the CPU 201 may automatically move the image capturing direction toward the optical axis direction closest to this image capturing direction at a predetermined speed or with acceleration, without changing the second image capturing mode. In the example in FIG. 6B, the direction 614 (image capturing direction) is automatically moved toward the direction 603 (optical axis direction of the image capturing lens 103b) at a predetermined speed or with acceleration, without changing the second image capturing mode. To express the state of maintaining the second image capturing mode, the periphery of the image capturing range 601 is indicated by the bold line in FIG. 6B. When the image capturing direction (direction 614) matches with the optical axis direction (direction 603), the CPU 201 switches the image capturing mode to set from the second image capturing mode to the first image capturing mode. FIG. 6C indicates a state after the image capturing mode is switched. Since the image capturing direction gradually changes, the user can recognize the change of the image capturing direction easily (immediately), and can adjust the image capturing direction easily (immediately) after the image capturing mode is switched.

As illustrated in FIGS. 7A to 7D, lens modules 704 and 706 (lens units) having at least one image capturing lens may be removably attached to the digital camera main unit 701. Further, a display module 702, which displays a live view image, may be removably attached to the digital camera main unit 701. In the same manner, a display 205 may be removably attached to the display control device 200. FIGS. 7A to 7D are side views of the digital camera. As mentioned above, the display control device 200 may perform processing similar to the remote live view processing in FIG. 3, but here it is assumed that the digital camera main unit 701 performs processing similar to the remote live view processing in FIG. 3.

Figure 7A:
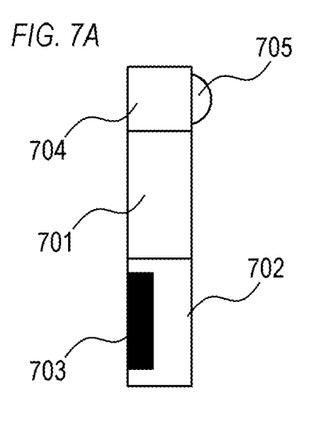
FIGS. 7A to 7D are schematic diagrams depicting various modules when attached to or detached from the digital camera.

In FIG. 7A, the lens module 704 and the display module 702 are attached to the digital camera main unit 701. The lens module 704 includes only an image capturing lens 705, which corresponds to the image capturing lens 103b, as the image capturing lens. When the lens module 704 is attached, the digital camera main unit 701 sets the first image capturing mode. While the lens module 704 is attached, only the first image capturing mode can be selected. Then the digital camera main unit 701 displays the image captured using the image capturing lens 705 on a display unit 703 of the display module 702, and stores the lens information related to the image capturing lens 705 (main lens) in the storage unit.

Figure 7B:
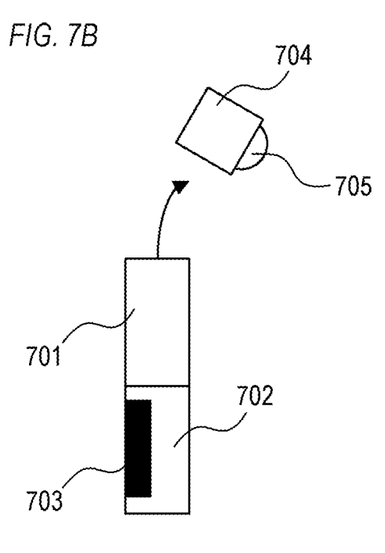

FIG. 7B indicates a state where the lens module 704 is detached from the digital camera main unit 701. The imaging using the image capturing lens 705 may be stopped at the timing when the lens module 704 is detached, or may be continuously performed even after the lens module 704 is detached. Further, after the lens module 704 is detached, the image captured using the image capturing lens 705 may be sent from the lens module 704 to the digital camera main unit 701 or to the display module 702 by wireless communication, and this image may be displayed on the display unit 703.

Figure 7C:
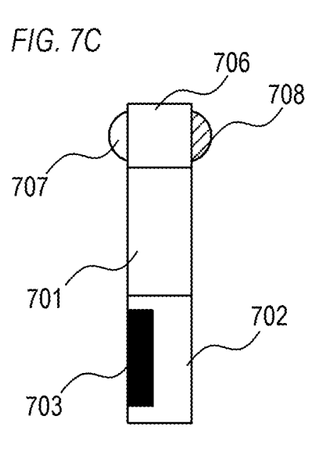

In FIG. 7C, a lens module 706 and the display module 702 are attached to the digital camera main unit 701. The lens module 706 includes an image capturing lens 707, which corresponds to the image capturing lens 103a, and an image capturing lens 708, which corresponds to the image capturing lens 103b. When the lens module 706 is attached, the digital camera main unit 701 sets the first image capturing mode or the second image capturing mode. While the lens module 706 is attached, the first image capturing mode and the second image capturing mode are selectable. When the lens module 706 is attached, the digital camera main unit 701 sets the first image capturing mode or the second image capturing mode. Then the digital camera main unit 701 determines the image capturing lens, which corresponds to the imaging range displayed on the display unit 703, as the main lens, and stores the lens information related to this main lens in the storage unit.

If the lens information has been stored in the storage unit at the timing when the lens module 706 is attached, the digital camera main unit 701 specifies the main lens based on this lens information, and displays the image of the imaging range corresponding to this main lens on the display unit 703. Here it is assumed that the lens module 704 is detached from the digital camera main unit 701, and the lens module 706 is attached to the digital camera main unit 701. In this case, based on the lens information related to the image capturing lens 705, the digital camera main unit 701 selects the image capturing lens 708 corresponding to the image capturing lens 705 (image capturing lens 103b) as the main lens. Then the digital camera main unit 701 displays an image captured using the image capturing lens 708 on the display unit 703. While the lens module 706 is attached, the digital camera main unit 701 performs processing similar to the remote live view processing in FIG. 3. Therefore in the case where the image capturing mode is switched, the main lens is specified based on the lens information stored in the storage unit, and the image of the imaging range corresponding to this main lens is displayed on the display unit 703.

Figure 7D:
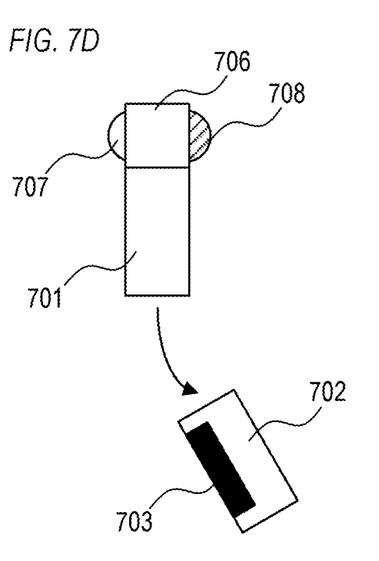

FIG. 7D indicates a state where the display module 702 is detached from the digital camera main unit 701. Here it is assumed that if the display module 702 is detached from the digital camera main unit 701, communication with the display module 702 stops, and images are no longer displayed on the display unit 703. In this case, determination (specification) of the main lens and storage of this information need not be performed.

The digital camera main unit 701 may display the live view image not on the display module 702 but on another display device that can communicate with the digital camera main unit 701. In this case, the display module 702 may or may not be attached to the digital camera main unit 701. The other display device is a smartphone, for example. The live view image is displayed on the smartphone (display unit of the smartphone) and the image capturing direction and the image capturing mode may be changed in accordance with the touch operation on the smartphone. The image capturing lens corresponding to the imaging range displayed on the smartphone may be determined as the main lens, and the lens information related to this main lens may be stored in the storage unit of the digital camera main unit 701. Further, an image synchronizing with the image displayed on the smartphone (e.g. same image as the image displayed on the smartphone) may be displayed on the display unit 703 of the display module 702, or the display unit 703 may be set to display nothing. The instruction by touch operation may be receivable by both the display unit 703 and the smartphone, or may be unreceivable by the display unit 703, and receivable only by the smartphone.

According to the present invention, the user can easily (immediately) recognize the range (direction) of an image displayed on the display, and easily capture an image in a desired range immediately after the image capturing mode is switched.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-022684, filed on Feb. 16, 2023, which is hereby incorporated by reference herein in its entirety.

What is claimed is:

1. An electronic device comprising:
a processor; and
a memory storing a program which, when executed by the processor, causes the electronic device to:
set one of a plurality of modes including a first mode and a second mode in which a size of an imaging range is different from that of the first mode; and
perform control such that an image captured by using at least one of a plurality of lenses, of which optical axis directions are mutually different, is displayed on a display,
wherein in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display,
wherein the lens satisfying the predetermined condition is a lens corresponding to an imaging range displayed on the display immediately before switching the mode to be set.

2. The electronic device according to claim 1, wherein the lens satisfying the predetermined condition is a lens corresponding to an imaging range displayed most widely on the display immediately before switching the mode to be set.

3. The electronic device according to claim 1, wherein a lens module including at least one lens is removably attachable to the electronic device, and
   in a case where the lens module is attached to the electronic device, a mode corresponding to the lens module is set.

4. The electronic device according to claim 1, wherein the display is disposed on an external device which is communicable with the electronic device, and
   one of the plurality of modes is set in accordance with a user operation performed on the external device.

5. The electronic device according to claim 1, wherein the first mode is a mode in which an image having an angle-of-view less than 180° is captured.

6. The electronic device according to claim 5, wherein the first mode is a mode in which an image is captured using any one of the plurality of lenses.

7. The electronic device according to claim 5, wherein in the first mode, a range to be displayed on the display, in the captured image, is unchangeable.

8. The electronic device according to claim 1, wherein the second mode is a mode in which an image having an angle-of-view of 360° is captured.

9. The electronic device according to claim 8, wherein the second mode is a mode in which an image is captured using a plurality of lenses.

10. The electronic device according to claim 8, wherein in the second mode, a range to be displayed on the display, in the captured image, is changeable.

11. An electronic device comprising:
   a processor; and
   a memory storing a program which, when executed by the processor, causes the electronic device to:
   set one of a plurality of modes including a first mode and a second mode in which a size of an imaging range is different from that of the first mode; and
   perform control such that an image captured by using at least one of a plurality of lenses, of which optical axis directions are mutually different, is displayed on a display,
   wherein, in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display,
   wherein, when the program is executed by the processor, the program further causes the electronic device to perform control such that lens information on a lens corresponding to an imaging range displayed on the display, out of the plurality of lenses, is recorded in a storage, and
   wherein, in a case where a mode to be set is switched from one of the first mode and the second mode to an other of the first mode and the second mode, a lens satisfying the predetermined condition is specified on a basis of the lens information stored in the storage.

12. The electronic device according to claim 11, wherein the lens information indicates at least one of: a lens corresponding to the imaging range displayed on the display; and an imaging direction corresponding to the imaging range.

13. An electronic device comprising:
   a processor; and
   a memory storing a program which, when executed by the processor, causes the electronic device to:
   set one of a plurality of modes including a first mode and a second mode in which a size of an imaging range is different from that of the first mode; and
   perform control such that an image captured by using at least one of a plurality of lenses, of which optical axis directions are mutually different, is displayed on a display,
   wherein, in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display,
   wherein the display is removably attachable to the electronic device, and
   wherein, in a case where the display is attached to the electronic device, and the mode to be set is switched from one of the first mode and the second mode to an other of the first mode and the second mode, a lens satisfying the predetermined condition is specified and control is performed such that an image of an imaging range corresponding to the lens is displayed on the display, and
   in a case where the display is not attached to the electronic device, a lens satisfying the predetermined condition is not specified.

14. An electronic device comprising:
   a processor; and
   a memory storing a program which, when executed by the processor, causes the electronic device to:
   set one of a plurality of modes including a first mode and a second mode in which a size of an imaging range is different from that of the first mode; and
   perform control such that an image captured by using at least one of a plurality of lenses, of which optical axis directions are mutually different, is displayed on a display,
   wherein, in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display,
   wherein the plurality of lenses include a first lens and a second lens,
   wherein, it is capable of switching, according to a user operation, an imaging range to be displayed on the display between an imaging range corresponding to the first lens and an imaging range corresponding to the second lens, and
   wherein control is performed such that in a case where the mode to be set is switched from one of the first mode and the second mode to an other of the first mode and the second mode in a state in which an imaging range corresponding to the first lens is displayed on the display, the imaging range corresponding to the first lens is displayed on the display in the other of the first mode and the second mode, and
   control is performed such that in a case where the imaging range to be displayed on the display is switched from the imaging range corresponding to the first lens to the imaging range corresponding to the second lens in a mode of the other of the first mode and the second mode, and the mode to be set is then switched from the other of the first mode and the second mode to the one of the first mode and the second mode, the imaging range corresponding to the second lens is displayed on the display in the one of the first mode and the second mode.

15. A control method of an electronic device comprising:
setting one of a plurality of modes including a first mode and a second mode in which a size of an imaging range is different from that of the first mode; and
performing control such that an image captured by using at least one of a plurality of lenses, of which optical axis directions are mutually different, is displayed on a display,
wherein, in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display,
wherein the lens satisfying the predetermined condition is a lens corresponding to an imaging range displayed on the display immediately before switching the mode to be set.

16. A non-transitory computer readable medium that stores a program, wherein the program causes a computer to execute a control method of an electronic device comprising:
setting one of a plurality of modes including a first mode and a second mode in which a size of an imaging range is different from that of the first mode; and
performing control such that an image captured by using at least one of a plurality of lenses, of which optical axis directions are mutually different, is displayed on a display, wherein
in a case where a mode to be set is switched from one of the first mode and the second mode to an other of the first mode and the second mode, control is performed such that an image in an imaging range corresponding to a lens satisfying a predetermined condition, out of the plurality of lenses, is displayed on the display,
wherein the lens satisfying the predetermined condition is a lens corresponding to an imaging range displayed on the display immediately before switching the mode to be set.

* * * * *